(12) United States Patent
Vernhes et al.

(10) Patent No.: US 12,259,081 B2
(45) Date of Patent: Mar. 25, 2025

(54) THERMAL INSULATING SLEEVE LINER FOR FLUID FLOW DEVICE AND FLUID FLOW DEVICE INCORPORATING SUCH LINER

(71) Applicant: VELAN INC., Montreal (CA)

(72) Inventors: Luc David Vernhes, Hampstead (CA); Fadila Khelfaoui, Montreal (CA); Alfredo Vincenzo Costantini, Laval (CA); Duc Thanh Tran, Montreal (CA)

(73) Assignee: VELAN INC., Montreal (CA)

( * ) Notice: Subject to any disclaimer, the term of this patent is extended or adjusted under 35 U.S.C. 154(b) by 447 days.

(21) Appl. No.: 17/484,369

(22) PCT Filed: Mar. 12, 2020

(86) PCT No.: PCT/IB2020/052256
§ 371 (c)(1),
(2) Date: Sep. 24, 2021

(87) PCT Pub. No.: WO2020/194106
PCT Pub. Date: Oct. 1, 2020

(65) Prior Publication Data
US 2022/0252206 A1    Aug. 11, 2022

Related U.S. Application Data

(60) Provisional application No. 62/823,357, filed on Mar. 25, 2019.

(51) Int. Cl.
*F16L 59/147* (2006.01)
*F16L 59/02* (2006.01)
(Continued)

(52) U.S. Cl.
CPC ........... *F16L 59/147* (2013.01); *F16L 59/021* (2013.01); *F16L 59/06* (2013.01); *F16L 59/143* (2013.01); *F16L 59/16* (2013.01)

(58) Field of Classification Search
CPC ....... F16L 59/147; F16L 59/021; F16L 59/06; F16L 59/143; F16L 59/16
(Continued)

(56) References Cited

U.S. PATENT DOCUMENTS 2,078,606 A    4/1937    Le Grand
2,361,383 A    10/1944   Coffman
(Continued)

FOREIGN PATENT DOCUMENTS

CN        1978970      6/2007
CN        105202294    12/2015
(Continued)

OTHER PUBLICATIONS

AXENS Ebullated Bed Hydrocracking Process, printed on Jan. 13, 2020 from https://www.axens.net/product/process-licensing/10092/h-oil-rc.html, 3 pp.
(Continued)

*Primary Examiner* — David R Deal
(74) *Attorney, Agent, or Firm* — Nixon & Vanderhye, PC

(57) ABSTRACT

A thermal insulating sleeve liner for fluid flow devices such as valves and piping used in severe industrial applications is preferably additively manufactured (e.g., by 3D printing) to fit into the bore of a protected fluid flow device. Internal interstices and/or external ribs provide added thermal insulation. An integrally formed end-lip or a separate end-cap secures and/or locates the sleeve liner within the protected fluid flow device between different diameter distal and proximal portions of the bore. If internal interstices are sealed they can be vacuumed or pressurized to enhance thermal insulating properties. Fitted dimensions are sufficiently small to prevent ingress of thermally conductive particles circulating in use within the flow path of the protected flow device. A pressure equalizing aperture can be
(Continued)

FIG. 4A provided on or through the sleeve if needed in some applications.

20 Claims, 6 Drawing Sheets

(51) Int. Cl.
    *F16L 59/06*     (2006.01)
    *F16L 59/14*     (2006.01)
    *F16L 59/16*     (2006.01)

(58) Field of Classification Search
    USPC .......................................................... 138/149
    See application file for complete search history.

(56) References Cited

U.S. PATENT DOCUMENTS

| | | | |
|---|---|---|---|
| 2,613,166 | A | 10/1952 | Gronemeyer |
| 3,945,215 | A | 3/1976 | Johnson et al. |
| 4,621,838 | A | 11/1986 | Kneidel et al. |
| 4,791,953 | A | 12/1988 | Berchem |
| 5,350,011 | A | 9/1994 | Sylvester |
| 6,220,079 | B1 | 4/2001 | Taylor |
| 6,575,197 | B2 | 6/2003 | Esser |
| 6,634,388 | B1 | 10/2003 | Taylor et al. |
| 6,959,916 | B2 | 11/2005 | Chigasaki et al. |
| 7,017,604 | B2 | 3/2006 | Newberg |
| 8,783,279 | B2 | 7/2014 | Williams, Jr. et al. |
| 2010/0071798 | A1 | 3/2010 | Tsapatsaris et al. |
| 2017/0129052 | A1 | 5/2017 | Buller et al. |
| 2018/0051834 | A1 | 2/2018 | Hofmann |
| 2018/0209322 | A1 | 7/2018 | Zhu et al. |

FOREIGN PATENT DOCUMENTS

| | | |
|---|---|---|
| CN | 209943625 | 1/2020 |
| DE | 3214918 | 11/1983 |
| EP | 1 046 423 | 10/2000 |

OTHER PUBLICATIONS

Clarke, David R. et al., "Thermal Barrier Coating Materials," Materialstoday, vol. 8, No. 6, Jun. 2005, pp. 22-29.
Dorf Ketal, Raising the Standard: Crude Preheat System Fouling Control, https://www.dorfketal.com/industry-solutions/refining/atmospheric-and-vacuum-distillation-units/pre-heat-exchanger-train, Accessed Sep. 23, 2020, 2 pp.
Frazier, William E., "Metal Additive Manufacturing: A Review," Journal of Materials Engineering and Performance, vol. 23, No. 6, Jun. 2014, pp. 1917-1928.
Herzog, Dirk et al, "Additive Manufacturing of Metals," Acta Materialia, vol. 117, 2016, pp. 371-392.
"Inconel," ChemEurope, [Online]. Available: http://www.chemeurope.com/en/encyclopedia/Inconel.html. [Accessed Aug. 22, 2018], 2 pp.
International Search Report dated Jun. 18, 2020 issued in PCT International Patent Application No. PCT/IB/2020/052256, 12 pp.
Jia, Qingbo et al., "Selective Laser Melting Additive Manufacturing of Inconel 718 Superalloy Parts: Densification, Microstructure and Properties," Journal of Alloys and Compounds, vol. 585, 2014, pp. 713-721.
Jones, R. L., "Thermal barrier coatings," Metallurgical and Ceramic Protective Coatings, 1996, pp. 194-235.
LC-Fining/LC-Max, LC-FINING / LM-MAX-CLG (Chevron Lummus Global)—MDR, Bottom of the Barrel Upgrading, printed on Jan. 13, 2020 from https://www.mcdermott.com/CLG/Bottom-C-FINING, 2 pp.
MOGAS Patents Thermal Sleeve, Solves Premature Stress Cracking, MOGAS Industries | Severe Service Ball Valves | Houston, Texas. [Online]. Available: https://www.mogas.com/es-mx/company/news/2016/mogas-patents-thermal-sleeve. [Accessed: Aug. 27,- 2018], 3 pp.
Motyka, Elaine, Protective Coatings Extend Valve Life in Sever Service Conditions, Materials & Manufacturing, www.valve-world.net, Sep. 2014, 3 pp.
"Overview of Thermal Fatigue," Inspectioneering, [Online]. Available from https://inspectioneering.com/tag/thermalfatigue. Accessed Aug. 22, 2018, 1 page.
Pontarollo, Alberto et al., Characterisation of Inconel 625 Coatings Deposited by Cold Spray, Conference Paper, ResearchGate, vol. 1, No. 1, Sep. 2011, Uploaded from https://www.researchgate.net/publication/289522915 on Jan. 7, 2016, 6 pp.
The Benefits of Finite Element Analysis in Manufacturing, Manor Tool & Manufacturing Company, [Online]. Available: https://www.manortool.com/finite-element-analysis. [Accessed Aug. 22, 2018], 5 pp.
Velan, Ebullated Bed Valve Solutions, 2019, 8 pp.
Velan, "Our heritage," Velan. [Online]. Available: https TW our Accessed: Aug. 27, 2018, 4 pp.
Why Choosing Inconel 718 for Aerospace Additive Manufacturing?, Farinia Group, [Online]. Available: https://www.farinia.com/additive-manufacturing/3d-materials/inconel-718-aerospace-additive-manufacturing. [Accessed Aug. 22, 2018].
Coatings for High-Temperature Structural Materials: Trends and Opportunities, 1996. Book.
"Fighting the Causes of Pavement Cracks," Du Pont, [Online]. Available: http://www.dupont.com/products-and-services/construction-materials/asphalt-paving-systems/articles/pavement-cracks.html. [Accessed Aug. 22, 2018].No longer posted.
Lee, W. E., "Thermal Shock Resistance of Laminated Ceramic Matrix Composites," Composites, vol. 23, No. 4, p. 282, 1992. https://www.dorfketal.com/industry-solutions/refining/atmospheric-and-vacuum-distillation-units/pre-heat-exchanger-train.
The American Society of Mechanical Engineers, "ASME Boiler and Pressure Vessel Code, Section II, Part D," ASME, New York, 2015. Standards.
Qianfan, "Durability and Reliability in Diesel Engine System Design," Diesel Engine System Design Book, 2013, pp. 113-202.

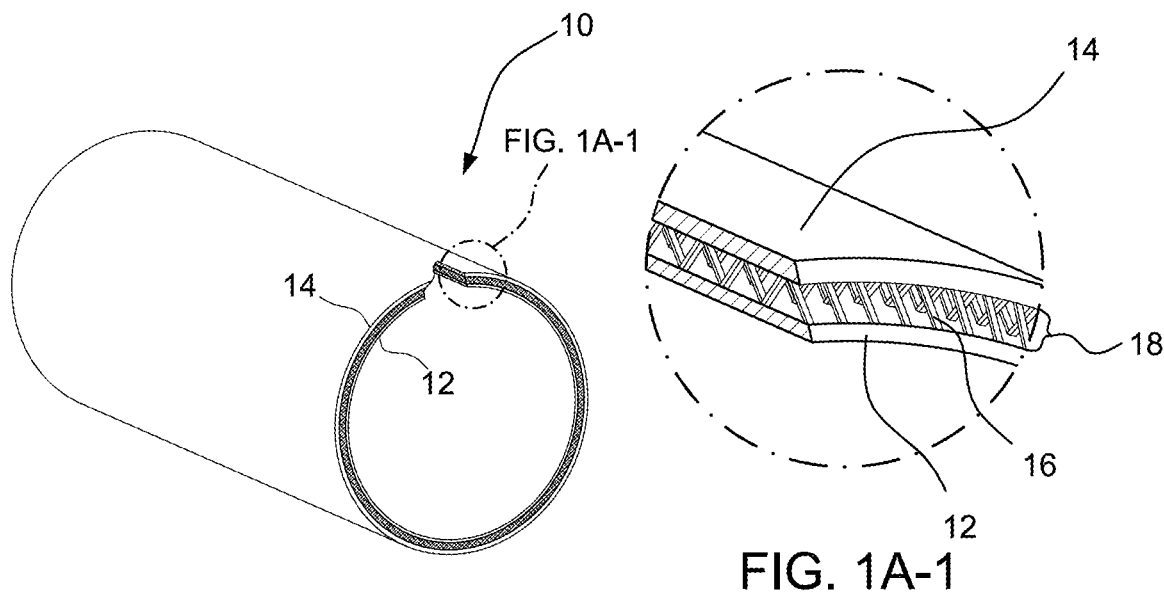
FIG. 1A
FIG. 1A-1
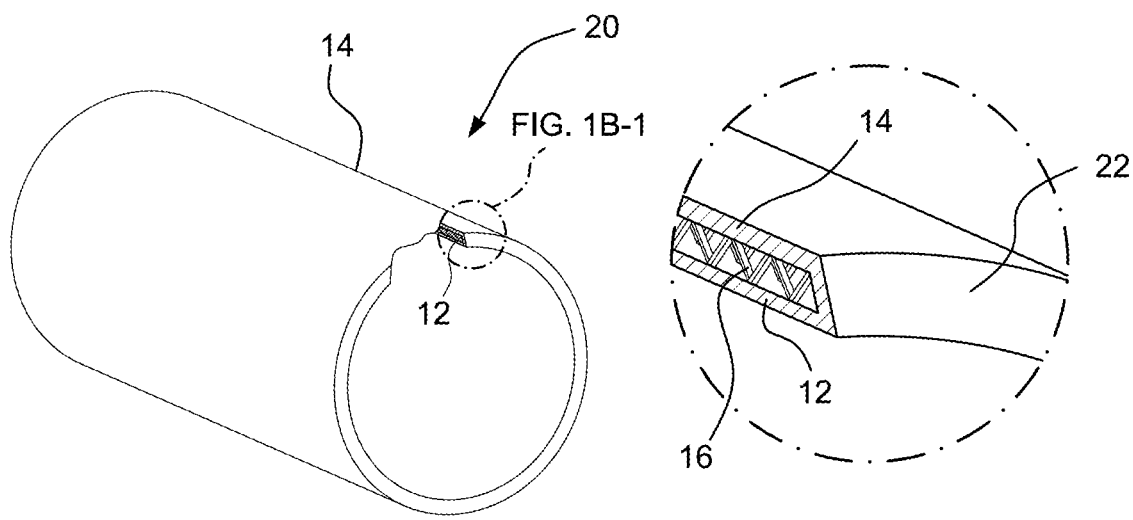
FIG. 1B
FIG. 1B-1

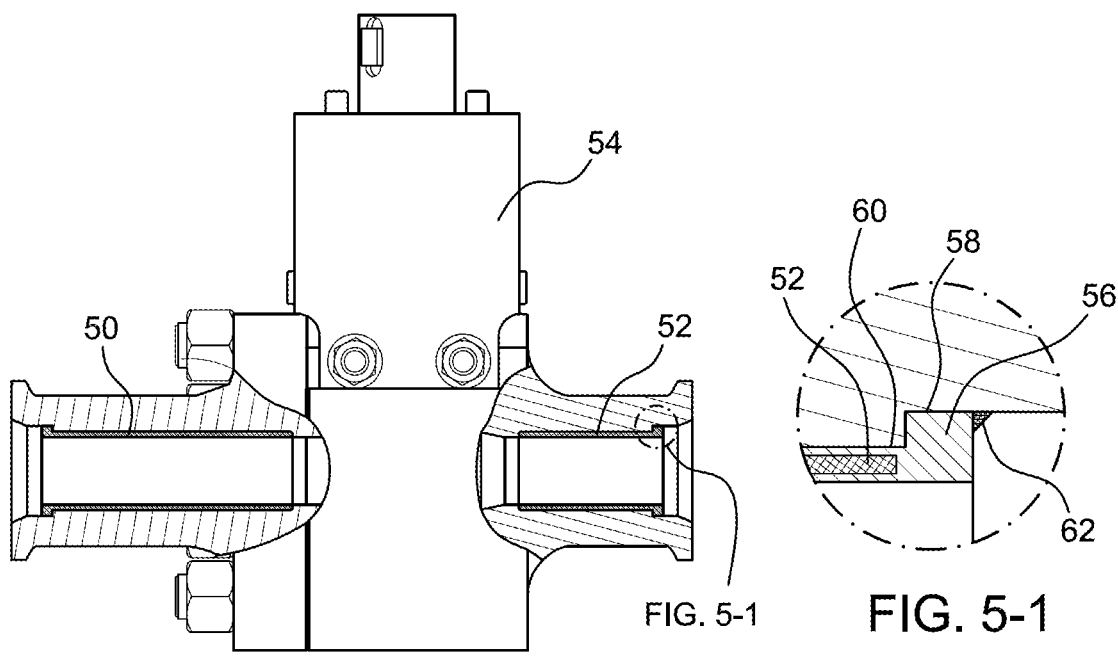
FIG. 5
FIG. 5-1
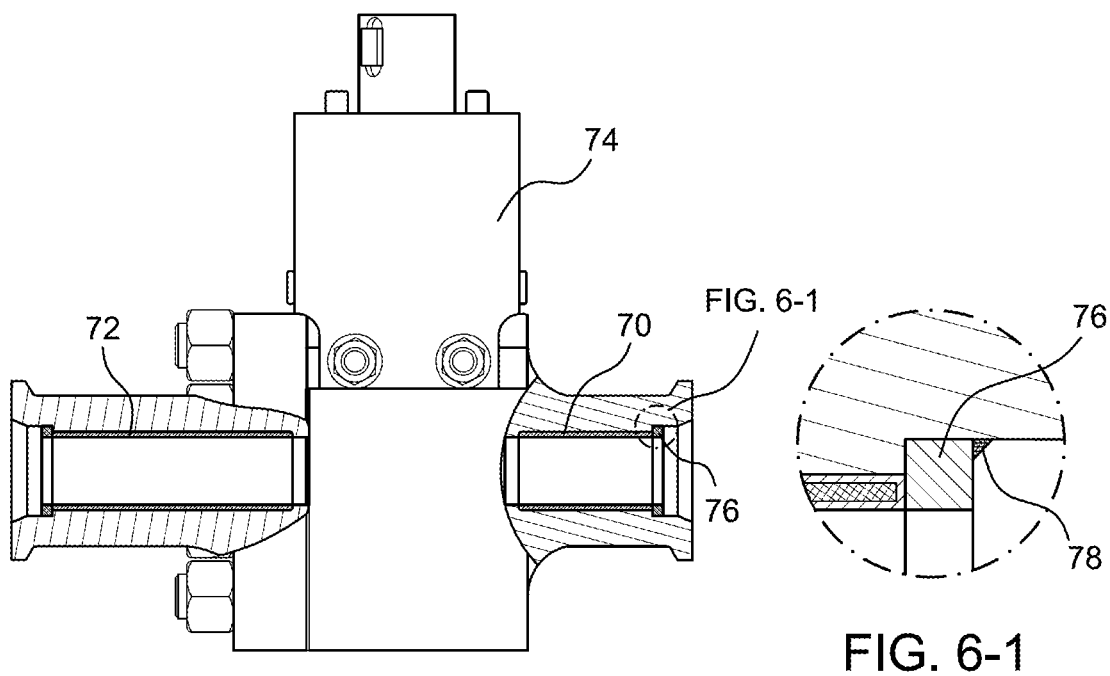
FIG. 6
FIG. 6-1

THERMAL INSULATING SLEEVE LINER FOR FLUID FLOW DEVICE AND FLUID FLOW DEVICE INCORPORATING SUCH LINER

CROSS-REFERENCES TO RELATED APPLICATIONS

This application is a continuation application of PCT/IB2020/052256 filed Mar. 12, 2020, which claims the benefit of U.S. Provisional Patent Application No. 62/823,357, filed Mar. 25, 2019, the entire content of which is herein incorporated by reference.

STATEMENT REGARDING FEDERALLY SPONSORED RESEARCH OR DEVELOPMENT (NOT APPLICABLE)

BACKGROUND & SUMMARY

Fluid flow devices (e.g., pipes, valves, nozzles and the like) subjected to thermal shocks in severe industrial applications can benefit from thermal protection to reduce thermal stresses, mitigate the effects of thermal shock experienced and prevent premature thermal fatigue. Fluid flow devices subject to cyclic high pressure and temperature changes make them prone to failure due to thermal shock. Thermal shock refers to a process wherein the flow device experiences sudden large magnitude changes in thermal stress when the heat flux and temperature gradient experienced by the flow device change abruptly.

Thermal shock damage can be found in various severe service industries (e.g., in a catalyst injection valve and its connection pipes in an ebullated bed hydro-processing ore refining application). In the case of an ebullated bed hydro-processing system, for instance, cracking of valve body and metal valve seats has been observed when valves are exposed to temperatures and pressures of up to 850° F. and 3,150 psi at 4-10 cycles per day. Cracking is thought to occur due to initial thermal stresses experienced when the valve is opened to experience such high temperature and pressure after several hours of having remained closed and therefore having reached ambient temperature. This phenomenon is especially observed during winter when external ambient temperature drops (e.g., to as low as −40° F.) and pre-heating systems fail.

Over the years, several innovations have been presented to help mitigate the effects of temperature surges and, in some cases, proposed solutions have been adopted. Some of the attempted solutions currently in use include use of materials having low thermal conductivity, use of pre-heating systems, use of thermal barrier coatings which are highly refractive, etc. While these attempted solutions have achieved some level of success, they continue to present shortcomings which are here addressed by several example embodiments of improved thermal insulating sleeve liners for fluid flow devices used in severe industrial applications.

Pre-heating systems have proven to be unreliable. There are reported cases where pre-heating systems malfunctioned and resulted in valve operations being carried out without pre-heating. Cracking of the valve body is especially observed when this occurs, and regular maintenance is required to avoid such incidents. This may be costly but even then normal operation is not guaranteed, especially during harsh weather conditions.

Adoption of low thermal conductivity materials has been proven not as effective since cracking could still be observed on the bodies of flow devices. This is a clear indication of their susceptibility to extreme cyclic temperatures. This led to the adoption of thermal barrier coatings (TBCs). While TBCs have generally been more effective in providing thermal shock protection, they too have several limitations. TBCs are susceptible to erosion and corrosion, especially in instances where they are in the flow path. TBCs require laborious and expensive processes for their preparation which results in high initial costs. And TBCs are notoriously brittle and prone to corrosion and erosion. Sleeves with TBCs need to be frequently replaced.

Some non-exhaustive examples of prior thermally insulating sleeve liners or other thermally protective internal interfaces for fluid flow devices can be found, for example, in the following prior published US patent documents: Newberg U.S. Pat. No. 7,017,602; Williams, Jr., et al. U.S. Pat. No. 8,783,279; Hofmann US 2018/0051834; and Zhu et al. US 2018/0209322.

The present document describes an improved, preferably additively manufactured (e.g., by 3D printing), thermal insulating sleeve liner constructed of a suitable material for the serviced application (e.g., Inconel 718® or other austenitic nickel-chromium-based super-alloys, high nickel alloys and the like or ceramic and/or composite materials of various types recognized by those in the art as being suitable for certain severe service applications) with an internal infill structural pattern creating internal voids which increase thermal insulation properties while yet remaining structurally adequate to serve as a thermal insulating flow device liner for the serviced application. Preferably the infill is sized to maximize strength (i.e., to support internal/external pressures to be experienced by the sleeve) while concurrently also minimizing heat transfer (i.e., from the inside to the outside of the sleeve). Multi-layer material could also be used if the sleeve is made with wear-resistant, corrosion-resistant, low thermal conductivity materials. When a 3D printed sleeve comes out of the printer, it is in a green state. Subsequently parts can be subjected to hot isostatic pressing (sometimes referred to as being "hipped") and/or heat treated to reduce porosity and increase mechanical properties respectively. Based on testing, all these three states are believed to work.

An object of example embodiments described herein is to provide a thermal protection device with varying designs based on the method of manufacture and intended application.

In one example embodiment, an additively manufactured (i.e., 3D printed) thermal sleeve includes two spaced-apart cylindrical shells and an internal infill pattern of integrally-formed supporting structure there-between. This thermally insulating sleeve is fitted into the flow path of the protected flow device (e.g., valves, pipes and the like). The sleeve could be locked by an interference fit with the body. Other locking methods such as brazing, welding or one or more retaining rings could be considered as well. The infill may have variable patterns that may be in the form of, but not limited to, centroidally-directed lattices, hollow honeycomb-like structures and so forth. These patterns form a porous network of supporting structure containing voids between the two shells. This network of structure entraps air (or other insulating material such as an inert nitrogen gas or an insulating vacuum) thus allowing for heavy internal insulation of flow devices to prevent or reduce thermal shock therein. Tessellations or other structural patterns inside the sleeve allow for free design of infill percentage making it customizable depending on process requirements and parameters. The end of the sleeve may be left open or fused. For sleeves having fused ends, the air-tight infill patterned region or chamber can be vacuumed or pressurized (e.g., with air or an inert gas).

In another example embodiment, a pressure equilibrium hole can be made on or through the sleeve. While the sleeve can remain acting as if a solid air-tight structure, the pressure equilibrium hole ensures a pressure balance between its inner and outer surfaces.

In another example embodiment, a non-encapsulated thermal sleeve is slip-fitted into a flow device bore. This sleeve can have variable exterior protruding surface patterns which can change depending on process requirements. Examples of these may include axially ribbed or radially ribbed exterior protruding surface patterns. Exterior surface patterns reduce the surface area in thermal contact with the interior bore body of the flow device while still allowing air entrapment there-within. This device is preferably additively manufactured (e.g., by 3D printing) although some embodiments may be manufactured by other processes. Depending on the application, the thermal sleeve may have a wear and abrasion resistant layer on its inner surface. Such functional graded layers can be deposited either by conventional deposition methods (such as a spray of thermal material) or by additive manufacturing (i.e., 3D printing) processes.

For an example embodiment installed in a flow device, the different sleeve concepts may be capped (e.g., using a separate circumferential ring-shaped cap structure) or they may have an integrally-formed circumferential ring-shaped lip in other embodiments to secure and/or locate the sleeve within the flow device. The lipped sleeve may be produced as a single piece while the capped sleeve has two distinct parts: the main sleeve part and the securing cap part. The lip or cap can interact with a larger diameter bore section at a proximal end of the main sleeve part and a narrower diameter bore section at the other distal end of the main sleeve part (so as to locate and trap the main sleeve part at a desired location within the flow device bore). The cap may be of the same material as the sleeve or of the same or similar material as the flow device. The securing cap can be welded to the flow device on the proximal larger diameter bore section after the main sleeve part has been snug-fit into a main bore length against the end face of a smaller diameter distal bore section thus retaining the main sleeve part at a desired location. The lip of a lipped sleeve, if that is used instead of a separate cap ring, can be similarly welded directly to the body of the flow device at the larger diameter proximal bore section to retain the sleeve at a desired location.

Some example embodiments of an improved additively manufactured thermal insulating sleeve liner are sized to have an outside dimension and surface area purposefully smaller than the inside dimension and surface area of the protected flow device, thereby reducing sleeve liner thermal contact with the protected flow device and thus enhancing its thermal protection. Dimensions should provide the loosest possible fit so long as it does not permit or cause excessive vibration or permit ingress of thermally conductive material in use. In some embodiments, a loose fit clearance of a few thousands of an inch (e.g., on the order of 0.002 inch) may be suitable.

Some example embodiments of the improved additively manufactured thermal insulating sleeve liner may include spaced-apart external (i.e., outwardly protruding) structures to insure less thermal contact with the internal surface of a protected flow device thus further reducing sleeve liner thermal contact with the protected flow device and enhancing its thermal protection.

Some example embodiments of the improved additively manufactured thermal insulating sleeve liner may include an integrally formed larger diameter lip at one end to assist in locating and/or retaining the sleeve liner properly within the protected flow device. Such a locating/retaining end lip (e.g., a diameter larger than the main sleeve liner body to retain a respectively associated end at a proper location in use) may also be formed as a separate retaining cap-ring structure that is secured (e.g., by a few tack or seal welds) at a proper location within the protected flow device.

Some example embodiments of the improved additively manufactured thermal insulating sleeve liner are installed within a protected flow device so as to provide an integrated flow device product incorporating the improved thermal insulating sleeve. However in use, due to wear and/or other deterioration in use, it will likely be necessary to periodically remove the thermal insulating sleeve (e.g., by breaking spot or seal welds holding it in place) and replace it with a new or refurbished thermal insulating sleeve. And if a flow device is not initially provided with the improved additively manufactured thermal insulating sleeve, then one can be retro-fitted into the flow device to thereafter provide desired thermal protection.

The improved additively manufactured thermal insulating sleeve liner is preferably constructed so as to prevent ingress of thermally conductive materials (e.g., catalyst particles which may typically be on the order of 0.8-1.0 mm in diameter with nickel-molybdenum active metal catalysts) into internal voids of the insulating sleeve or between the outer sleeve surface and the internal surface of the protected flow device. In this way the thermal insulating and protective properties of the sleeve can be better maintained. At the same time, some pressure equalization may be needed, at least in some applications, between the inside and outside surfaces of the insulating sleeve (perhaps including internal voids of the sleeve). If a pressure equalization path is needed, care should be taken to keep the pressure equalization path(s) small enough to prevent ingress of flowing thermally conductive particles (e.g., metallic catalyst particles).

Some example embodiments of the additively manufactured thermal insulating sleeve liner have two solid shells sandwiching a concurrently formed additively manufactured infill pattern (i.e., manufactured by a conventional 3D printing process). The infill pattern may vary and may range from simple honeycomb structures to complex lattice structures depending on process requirements and parameters. The sleeve may have an open end, or the ends may be fused to make the sleeve airtight. In the case of an airtight sleeve, the infill pattern chamber voids may be vacuumed or pressurized.

Some example embodiments of the additively manufactured thermal insulating sleeve liner are non-encapsulated with variable patterns on the external sleeve surface that may be modified depending on the application.

Some example embodiments of the additively manufactured thermal insulating sleeve liner have a wear-resistant coating along the axial flow way.

Some example embodiments of the additively manufactured thermal insulating sleeve liner are trapped via a separate retaining cap or have an integral lip which in either case is welded to one end of the bore to be protected on the flow device (e.g., with spot welds or seal welds that can be easily broken when it is desired to remove/replace a previously installed insulating sleeve).

The example embodiments described herein offer several advantages. The additively manufactured (e.g., 3D printed) thermal insulating sleeve device is produced in one manufacturing step resulting in considerable savings. It requires little lead time as the design process is much shorter than other manufacturing methods. Validation of the parts can commence as soon as the part is printed. Since the device can be additively manufactured, unique and more complex structures can be made for the infill without interfering with sleeve integrity. Additionally, there is very little material wasted in an additive manufacturing process and a homogeneous density of the resulting insulating sleeve ensures a more evenly distributed sleeve strength.

To reduce the laborious procedure that would involve dis-assembly of the protected flow device during part replacement or planned plant maintenance, the present example embodiments are designed to be easily replaceable upon reaching the end of design life. This can be done by removing the flow device from the process and sliding the loosely fit sleeve out of the flow device bore (after light holding spot or seal welds are broken). Additionally, toughness of the material involved will ensure that the sleeve is more robust than in the past thus ensuring, among other things, less scrap and a potential for the sleeve material to be re-used.

BRIEF DESCRIPTION OF THE DRAWINGS

The accompanying drawings depict various example embodiments for illustrative purposes but are not to be construed as limiting the scope of later appended claims.

FIG. 1A is an isometric view of an example additively manufactured open-ended thermal insulating sleeve with an accompanying enlarged local section at FIG. 1A-1 to better depict an infill pattern sandwiched between two shells;

FIG. 1B is an isometric view of an example additively manufactured fuse-ended thermal insulating sleeve with an accompanying enlarged local section at FIG. 1B-1 to better depict the internal infill pattern as in FIG. 1A-1;

FIG. 5 is a schematic partially sectioned view of an example lipped thermal protection sleeve installed in a bore on a protected flow device and an accompanying enlarged partial sectional view at FIG. 5-1 to better illustrate how it is fitted into the bore;

FIG. 6 is a schematic partially sectioned view of an example capped thermal protection sleeve installed in the bores of a flow device and an accompanying enlarged partial sectional view at FIG. 6-1 to better illustrate how a capped sleeve is fitted into a bore.

DETAILED DESCRIPTION OF EXAMPLE NON-LIMITING EMBODIMENTS

Figures 1, 2A:
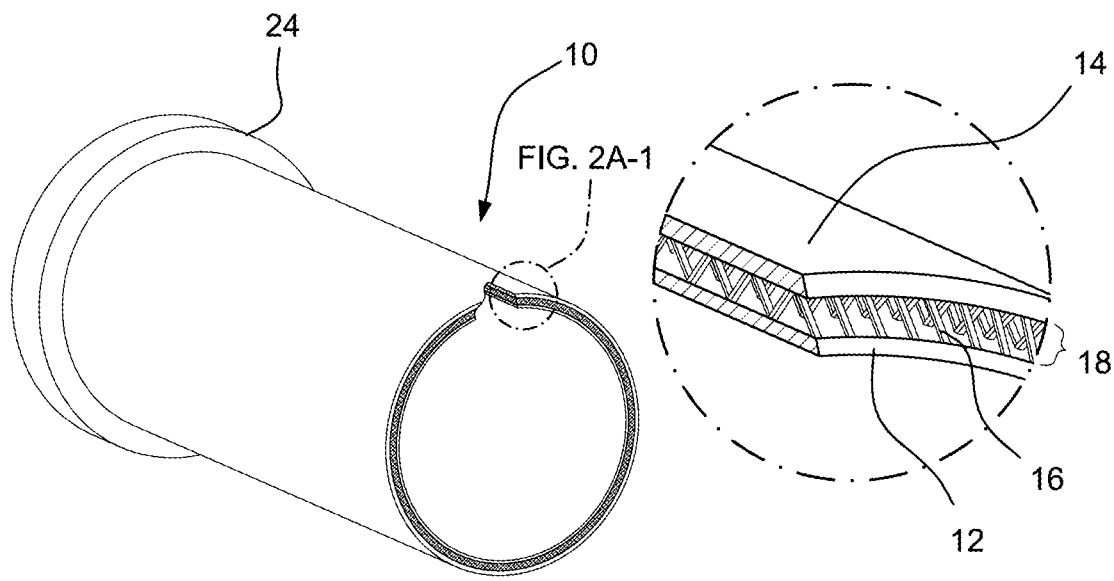
FIG. 2A is an isometric view of an example additively manufactured capped (or lipped) at one end and open-ended at the other end thermal insulating sleeve with an accompanying enlarged local section at FIG. 2A-1 to better depict an infill pattern sandwiched between two shells.

In the accompanying drawings identical reference numerals may have been used to identify features which are identical or similar in function. The example embodiments demonstrate varied designs based on similar concepts to provide an overall view of example thermal insulating sleeve liner interactions with flow devices.

FIG. 1A is a schematic isometric general overview of a thermal insulating sleeve 10 having an inner shell 12, outer shell 14, an infill pattern 16 of supporting structure with included voids provided between the inner and outer shells 12, 14, and open ends 18 (e.g., see FIG. 1A-1). The material and infill pattern 16 of the thermal sleeve can be varied to offer different strengths and thermal insulation depending on the application for which it is intended. As those in the art will appreciate, a typical ebullated bed hydro-processing application flow device conveys a corrosive liquid carrying small (e.g., 0.8-1.0 mm diameter) titanium catalyst particles at temperatures on the order of 800-1,100° F. at a pressure on the order of 3,400 psi. In this application, as those in the art will appreciate, a thermal insulating sleeve liner could typically be made of a tungsten alloy. As those in the art will recognize, the material and structure of the thermal insulating sleeve liner must be chosen appropriately in accordance with conventional standard design practices to accommodate process parameters of the application being serviced. Such sleeve characteristics are typically determined by the extreme pressures and temperatures to which the sleeve will be subjected. The thermally insulating sleeve liner 10 can be slip-fit into a flow device bore. The open ends 18 should be fitted to mating internal surfaces of the flow device sufficiently closely to make it impossible for solid entrapment (e.g., of metallic thermally conductive catalyst particles) within the chamber of the infill pattern 16 or between the outer shell 14 and the inner surfaces of the flow device.

Complex lattice infill patterns 16 provide a longer and indirect path for thermal conduction while air (or other insulating material or vacuum) trapped in between the two shells due to interstices of the infill pattern 16 possesses poor thermal conduction properties leading to increased thermal insulation.

FIG. 1B is a schematic isometric general overview of a thermal insulating sleeve 20 having an inner shell 12, outer shell 14, an infill pattern 16 of supporting structure with included interstice voids provided between the inner and outer shells 12, 14, and fused ends 22 (i.e., closed ends 22 as depicted in FIG. 1B-1 so as to encapsulate the voids included within the infill structure 16 between shells 12, 14 and ends 22). As with the thermal sleeve 10 of FIGS. 1A and 1A-1, the material and infill pattern 16 of the thermal sleeve 20 can be varied to offer different strengths and thermal insulation depending on the application for which it is intended. Here the voids within the chamber containing infill pattern 16 can be vacuumed or pressurized before ends 22 are fused shut (e.g., one end can be left partially open and connected to a source of vacuum or pressurized thermally insulating gas or liquid fluid before this partial opening is also fused to a fully closed configuration). Once the voids are thus suitably treated and the ends 22 fused to a closed state, the thermally insulating sleeve liner 20 can be slip-fit into a flow device bore. The fused closed ends 22 make it impossible for solid entrapment (e.g., of metallic thermally conductive catalyst particles) within the chamber of the infill pattern 16. The fused ends 22 should be fitted to mating internal surfaces of the flow device sufficiently closely to make it impossible for solid entrapment (e.g., of metallic thermally conductive catalyst particles) between the outer shell 14 and the inner surfaces of the flow device.

While some prior art thermally insulating sleeve liners have been shrink-fitted into tight engagement with the internal walls of the flow device, it is preferred to only loosely slip-fit the thermally insulating sleeve liner 10 or 20 within the internal bore walls of the flow device so as to provide additional thermal insulation between a hot corrosive high pressure flowing substance and the flow device structures.

Figures 1, 2B:
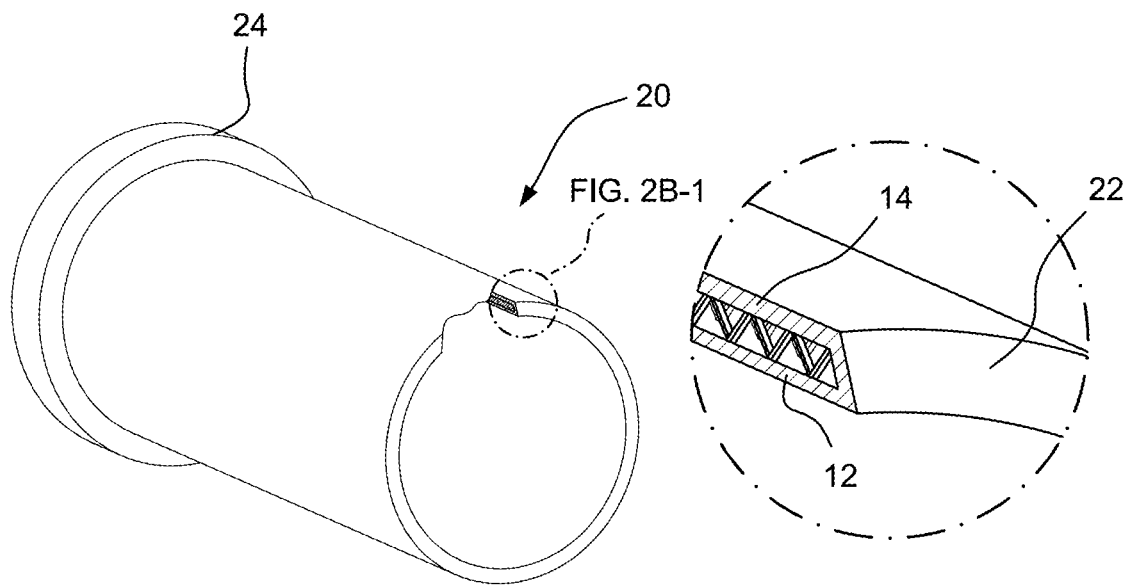
FIG. 2B is an isometric view of an example additively manufactured capped (or lipped) at one end and fused at the other end thermal insulating sleeve with an accompanying enlarged local section at FIG. 2B-1 to better depict the internal infill pattern as in FIG. 2A-1.

FIG. 2A and FIG. 2B depict the example thermal insulating sleeves 10 and 20, respectively, with an included securing cap or lip 24 at one end. A securing cap may be separately constructed and fitted at an end of the sleeve when installed within a flow device to secure it at a proper location in use within a flow device. A securing lip may be constructed as an integral part of the sleeve at an end to secure it at a proper location in use within a flow device.

Figure 3A:
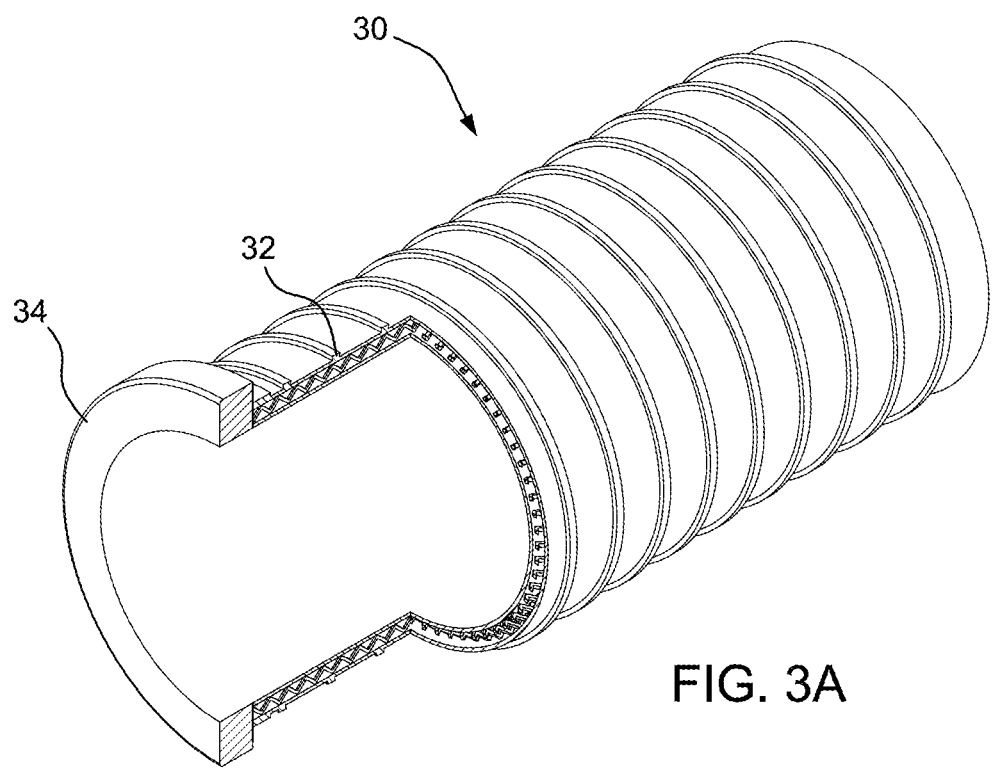
FIG. 3A is an isometric and partially sectioned view of an example capped and additively manufactured radially ribbed thermal insulating sleeve.

FIG. 3A depicts an example capped radially-ribbed thermally insulating sleeve liner 30. The externally extending interstices between ribs 32 will provide additional thermally insulating spaces when fitted within the internal surfaces of a flow device bore. Example sleeve liner 30 is preferably created by additive manufacturing (i.e., 3D printing) to provide a central portion of the sleeve body between inner and outer shells with an infill pattern as in the examples of FIGS. 1A, 1A-1, 1B, 1B-1, 2A, 2A-1, 2B, and 2B-1 to provide still further thermal insulation as in these earlier-described embodiments. The section cut highlights an end contact between the sleeve 30 and a separate securing cap 34 (which functions, like the securing cap of earlier-described embodiments). As those in the art will recognize, the securing cap 34 could be replaced by an integrally manufactured securing/locating lip if desired (as depicted in FIG. 3B).

Figure 3B:
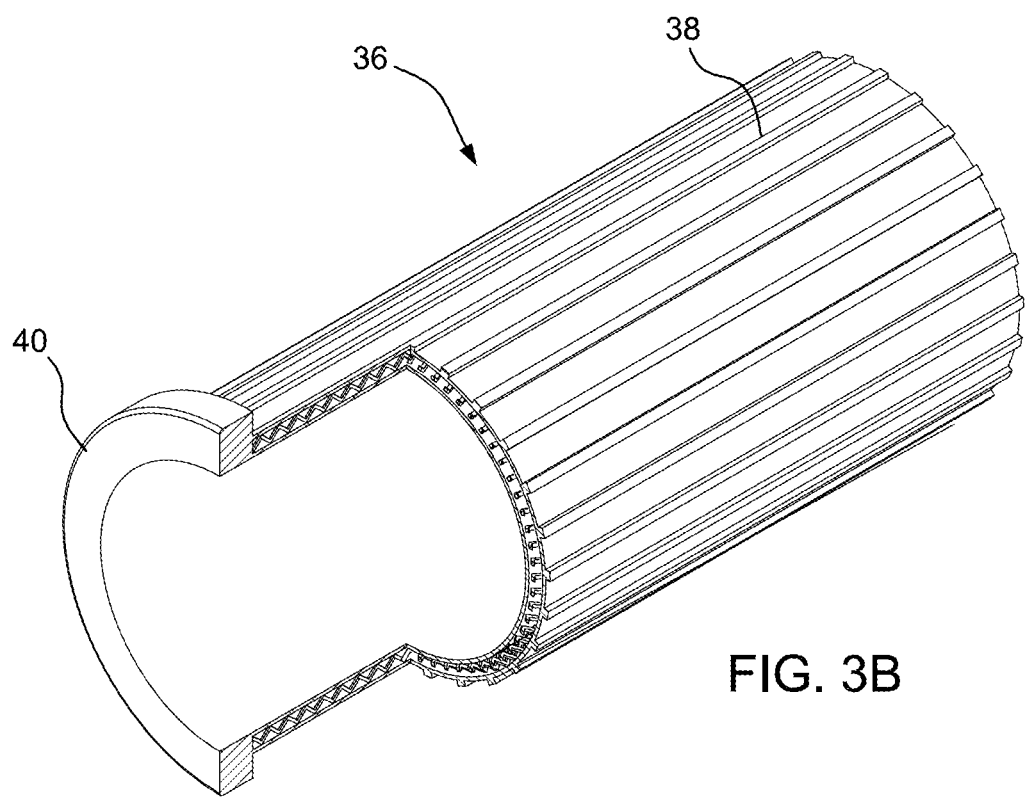
FIG. 3B is an isometric and partially sectioned view of an example lipped and additively manufactured axially ribbed thermal insulating sleeve.

FIG. 3B depicts an example lipped axially-ribbed thermally insulating sleeve liner 36. The externally extending interstices between ribs 38 provide thermally insulating spaces when fitted within the internal surfaces of a flow device bore. Example sleeve liner 36 is preferably created by additive manufacturing (i.e., 3D printing) to provide a central portion of the sleeve body between inner and outer shells with an infill pattern as in the examples of FIGS. 1A, 1A-1, 1B, 1B-1, 2A, 2A-1, 2B, 2B-1 to provide still further thermal insulation as in these earlier-described embodiments. The section cut highlights the integrally formed securing/locating lip 40 formed at an end of the sleeve 36 (which functions, like the locating/securing lip of earlier-described embodiments). As those in the art will recognize, the locating/securing lip 40 could be replaced by a separate securing/locating cap if desired (as depicted in FIG. 3A).

When disposed about an axial flow passage within a flow device bore (e.g., as shown in FIGS. 4-7), the externally ribbed sleeve 30 or 36 makes less surface contact with the flow device bores due to the surface pattern of ribs on its exterior thereby reducing thermal stress concentration points.

While FIGS. 3A and 3B illustrate two options of radially-ribbed and axially ribbed exterior surfaces, as those in the art will appreciate, the ribbed pattern can be modified as desired to accommodate requirements of various processes.

Figure 4:
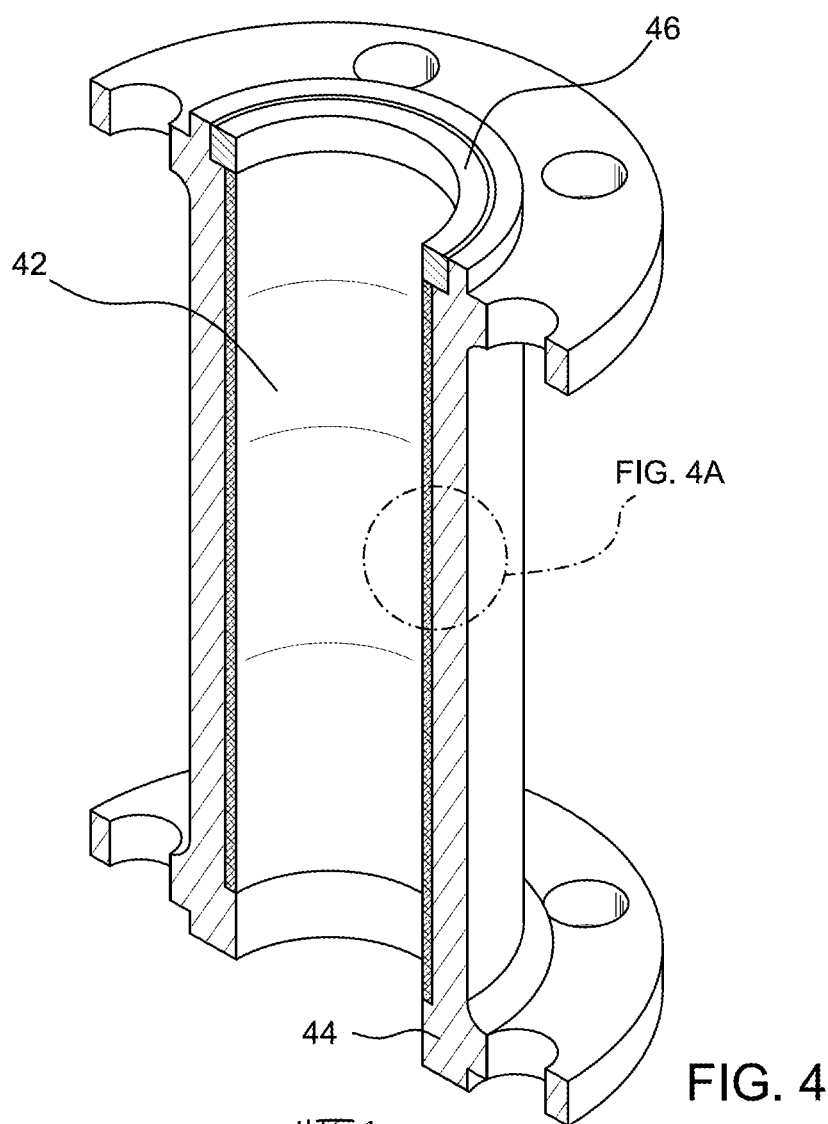
FIG. 4 is a schematic sectioned isometric view of an example capped thermal protection sleeve installed in a flanged flow device with an enlarged local section at FIG. 4A to better depict the internal infill pattern.
Figure 4A:
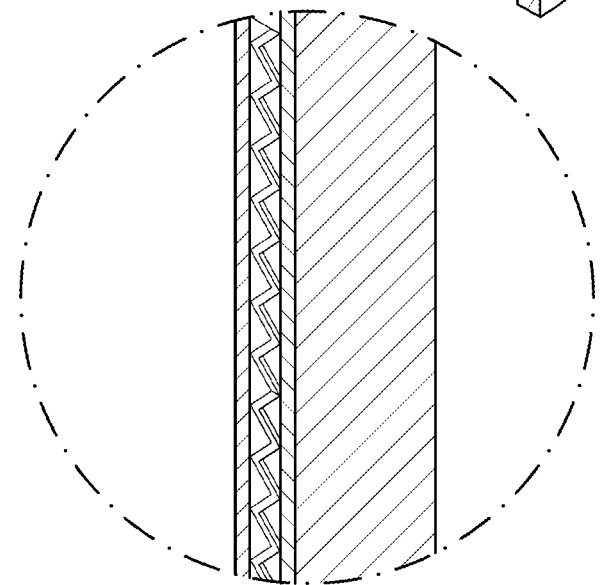

FIGS. 4 and 4-1 depict a capped thermal protection sleeve 42 installed in a flow device 44. The thermally insulating sleeve 42 (of any example embodiment described herein) can be disposed in a flow device (e.g., flanged pipe 44) detachably connectable to other flow devices (e.g., valves). The interaction between the sleeve 42 and the pipe 44 is like that between an example sleeve and the internal flow surfaces of other flow devices (e.g., valves). The example thermally insulating sleeve 42 is slip-fitted into a bore of the pipe body that has a smaller diameter end portion locating and closing (if the sleeve does not already have a closed end) one end of the sleeve 42 to the ingress of flowing thermally conducting materials in use. A securing cap 46, disposed within a larger diameter end portion of the flow device bore, secures and locates the other end of the thermal insulating sleeve 42 within the flow device bore (and closes it to ingress of flowing thermally conducting materials in use if the sleeve does not already have a closed end).

FIG. 5 depicts lipped thermal protective sleeves 50, 52 slip fitted into flanged pipe input/output ports of a valve 54. In an enlarged partial section view depicted at FIG. 5-1, the outer surfaces of integral securing/locating lip 56 of sleeve 52 is mated to a larger diameter proximal internal bore section 58 while the main body of sleeve 52 is slip-fit into the relatively narrower main bore 60 of the flow device valve 54—and the other end of sleeve 52 is butted to a narrower diameter distal bore section. The lip 58 is held in place during use by weld(s) 62 (e.g., spot or seal welds that can be easily broken when it is desired to remove/replace the sleeve 52).

As those in the art should now appreciate, the general installation overview of FIGS. 5 and 5-1 also can be used for a capped thermal protective sleeve (with open or fused ends and a separate locating/securing cap at the proximal end). As such, the arrangement of FIG. 5 can be used for all lipped or capped sleeve example embodiments. This includes the radially ribbed, axially ribbed, the in-filled lattice sleeves of FIGS. 1A, 1B, 2A, 2B and so forth whether capped or lipped.

FIG. 6 illustrates capped thermal protective sleeves 70, 72 slip fitted within the bores of a flow device (e.g., the flanged input/output pipes of a valve 74). Like the lipped sleeve of FIG. 5, this arrangement applies in general to all example thermally insulating sleeves. The sleeves 70, 72 are fitted into the flow device 74 just like sleeves 50, 52 are fitted into the flow device 54. However, as depicted in the enlarged view at FIG. 5-1, since a separate securing cap 76 is now employed (instead of the integral lip 56 in FIG. 5), the securing cap 76 is held in place during use by weld(s) 78 (e.g., spot or seal welds that can be easily broken) while the distal other end of a sleeve is located against a smaller diameter bore section at the opposite distal end of the flow device bore (with a sufficiently small clearance fit to prevent ingress of thermally conductive material during use). This arrangement holds for all capped or lipped sleeve example embodiments. This includes the radially ribbed, axially ribbed, the in-filled lattice sleeves of FIGS. 1A, 1B, 2A, 2B and so forth whether capped or lipped.

Figure 7:
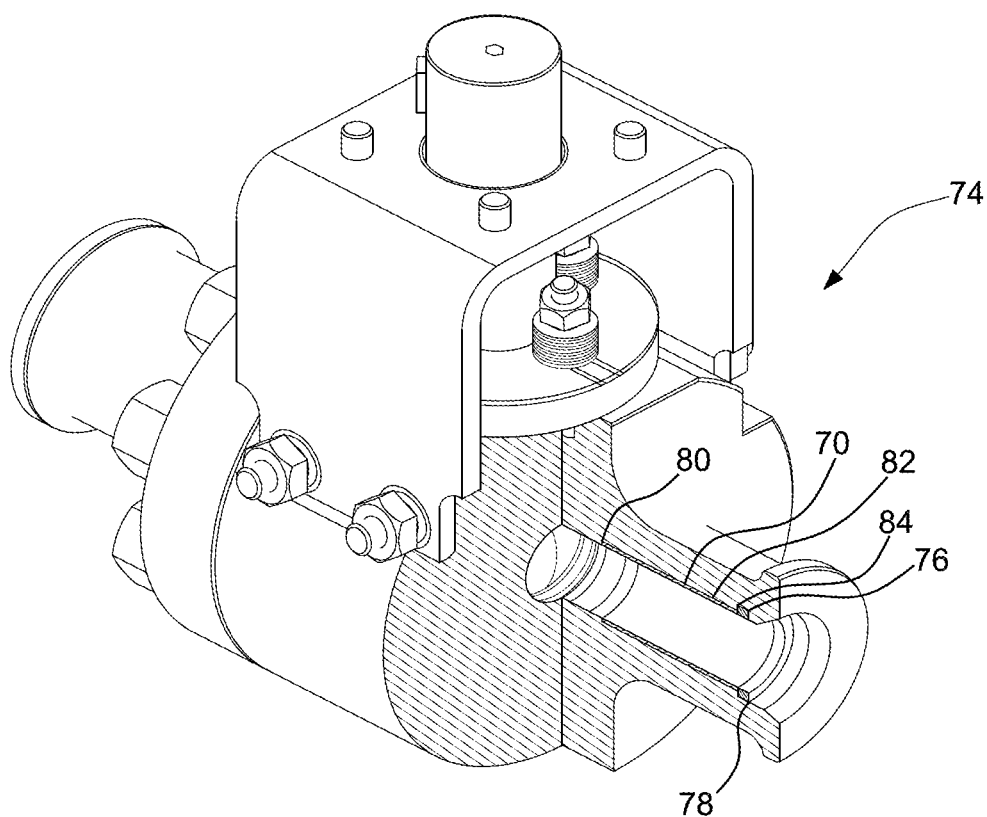
FIG. 7 is a schematic partially sectioned isometric view of a valve flow device having two flanged end connection pipes with installed thermal protection sleeves there-within.

FIG. 7 is a cut-away schematic isometric view of valve 74 in FIG. 6 showing sleeve 70 having its distal end butted to a smaller diameter distal end 80 of flow device bore 82 and trapped there by the larger diameter cap 76 within larger diameter proximal bore 84 by weld(s) 78.

To establish some measure of efficiency for an example embodiment, a 3-dimensional finite element analysis using a transient thermal technique was conducted for a ball valve having a flanged end connector inside diameter of 2.3 inches and an outside diameter of 4.5 inches, subjected to extreme temperature and pressure cycles between 400° C. (752° F.) and 14 MPa (2,030.5 psi) respectively. Three different setups were used: the flow device without any thermal protective device; the flow device with the internal surface that interacts with the axial flow path coated with thermal and wear resistant materials; and the flow device with a thermal protective sleeve as shown in FIGS. 5-6. The thermal protective sleeve was made of Inconel 718® by conventional 3D printing processes.

Peak stress intensities in the end connectors was found to be 605 MPa for the flow device without any thermal protective technology, 511 MPa for the model with the thermal and wear-resistant coatings and 259 MPa for the model with a thermal protective sleeve of the type described herein. This translates to a design life of 1,800 cycles, 2,900 cycles and 40,000 cycles respectively from fatigue design curves using fatigue analysis based on American Society of Mechanical Engineers (ASME) criteria (i.e., ASME 2015 Boiler & Pressure Vessel Code Section II Part D and Section III A were used for the fatigue analysis).

Preferably the thermally insulating sleeve is additively manufactured (e.g., by 3D printing), constructed of a suitable material for the serviced application (e.g., Inconel 718® or other austenitic nickel-chromium-based super-alloys, high nickel alloys and the like or ceramic and/or composite materials of various types recognized by those in the art as being suitable for certain severe service applications) with an internal infill structural pattern creating internal voids which increase thermal insulation properties while yet remaining structurally adequate to serve as a thermal insulating flow device liner for the serviced application. Preferably the infill is sized to maximize strength (i.e., to support internal/external pressures to be experienced by the sleeve) while concurrently also minimizing heat transfer (i.e., from the inside to the outside of the sleeve). Multi-layer material could also be used if the sleeve is made with wear-resistant, corrosion-resistant, low thermal conductivity materials. When a 3D printed sleeve comes out of the printer, it is in a green state. Subsequently parts can be subjected to hot isostatic pressing (sometimes referred to as being "hipped") and/or heat treated to reduce porosity and increase mechanical properties respectively. Based on testing, all these three states are believed to work.

Depending on the application, the interior surface of the example embodiments may be sprayed with a suitable wear-resistant coating as those in the art will appreciate.

The functionality of the example embodiments is not limited to any particular flow device as those in the art will appreciate.

Example thermal insulating sleeve liners for a fluid flow device provide a loosely-fit additively manufactured thermal protective sleeve disposed axially in bores of flow devices such valves and pipes. The sleeve may have variable designs depending on applications and may include, but are not limited to: (a) a sleeve made of an internal shell, an outer shell and an infill pattern; (b) a sleeve with radial ridges; (c) a sleeve that is ribbed axially—and wherein the infill lattice structures and exterior surface patterns may be modified to meet process parameters. Any of these examples may be lipped or capped depending on the preferred arrangement and/or weld.

An example thermal insulating sleeve liner structure having an internal shell, an outer shell and fused ends may have an airtight vacuumed infill chamber.

An example flow device fitted with an example thermal insulating sleeve liner may have an internal shell, an outer shell an infill chamber there-between with fused ends and a pressure equilibrium hole there-through.

An example thermal insulating sleeve liner structure may have an internal shell, outer shell, a pressurized infill chamber and seal-welded ends.

An example thermal insulating sleeve liner structure may be made of a high nickel alloy.

An example thermal insulating sleeve liner structure may have a wear-resistant coating on its inner surface of an internal shell.

An example thermal insulating sleeve liner structure may use a securing cap which may or may not be of the same material as the body of the flow device to which it is welded within a bore of the flow device. Alternatively, the securing cap may be threaded for a threaded connection with the bore of a flow device.

An example thermal insulating sleeve liner structure may include an integral lip welded to a bore on the body of the protected flow device.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A thermal insulating sleeve liner configured for use in a fluid flow device subjected to cyclic extreme thermal shock, for being installed within a fluid flow bore of the fluid flow device comprising a valve with flanged pipe connectors, and for being installed within at least one of the flanged pipe connectors of the valve, said configured thermal insulating sleeve liner comprising:
    an additively manufactured monolithic hollow cylindrical metallic sleeve having an outer diameter sized to slide into a fluid flow path bore of a fluid flow device thereafter accommodating a fluid flow path therewithin, said metallic sleeve having two spaced-apart cylindrical shells and an internal infill pattern of integrally formed supporting structure there-between including internal interstices providing increased thermal resistance to heat flowing from inside the sleeve to outside the sleeve.

2. The thermal insulating sleeve liner as in claim 1 further comprising:
    an integrally formed securing/locating lip of increased diameter at one end of the cylindrical sleeve.

3. A fluid flow device having the thermal insulating sleeve liner as in claim 2 installed within the fluid flow bore of the fluid flow device, wherein said securing/locating lip at one end is fitted within and affixed to an increased diameter proximal portion of the fluid flow bore, the other end of the sleeve being butted against a smaller diameter distal portion of the fluid flow bore.

4. The thermal insulating sleeve liner as in claim 1 wherein the sleeve was additively manufactured by a 3D printing process which provides a pattern of externally protruding ribs defining its outer diameter.

5. The thermal insulating sleeve liner as in claim 1 wherein the sleeve was additively manufactured by a 3D printing process which provides:

an inner shell, an outer shell, a plurality of patterned internally located supporting structures formed within a chamber between said inner and outer shells, said internally located supporting structures being configured to include integrally formed voids.

6. The thermal insulating sleeve liner as in claim 5 wherein ends of said chamber are closed to make said chamber air-tight.

7. The thermal insulating sleeve liner as in claim 6 wherein, before complete closure of said chamber ends, said included voids are vacuumed or pressurized with a thermally insulating fluid.

8. A fluid flow device having the thermal insulating sleeve liner as in claim 1 installed within a fluid flow bore of the fluid flow device.

9. The fluid flow device as in claim 8 comprising a valve with flanged pipe connectors, said thermal insulating sleeve liner being installed within at least one of the flanged pipe connectors of the valve.

10. A fluid flow device having the thermal insulating sleeve liner as in claim 1 installed within the fluid flow bore of the fluid flow device and further comprising a separate securing/locating ring-shaped cap disposed at a proximal end of the sleeve fitted within and affixed to an increased diameter proximal portion of the fluid flow bore, the other end of the sleeve being butted against a smaller diameter distal portion of the fluid flow bore.

11. The thermal insulating sleeve liner as in claim 1 wherein the sleeve has at least one pressure equalizing aperture therein sized to prevent ingress of thermally conductive particles in use.

12. The thermal insulating sleeve liner as in claim 1, further comprising a wear-resistant coating on an inner surface of the internal shell of the two spaced-apart cylindrical shells.

13. A thermal insulating sleeve liner configured for use in a fluid flow device within a serviced application and subjected to cyclic extreme thermal shock, for being installed within a fluid flow bore of the fluid flow device comprising a valve with flanged pipe connectors, and for being installed within at least one of the flanged pipe connectors of the valve, said configured thermal insulating sleeve liner comprising:

an additively manufactured monolithic thermal insulating sleeve liner constructed of a metallic material suitable for the serviced application with two spaced apart cylindrical shells and an internal infill structural pattern of integrally formed supporting structure there-between creating internal voids which increase thermal insulation properties while yet remaining structurally adequate to serve as a thermal insulating flow device liner for the serviced application.

14. The thermal insulating sleeve liner as in claim 13 comprising a nickel-chromium alloy.

15. The thermal insulating sleeve liner as in claim 13 further comprising an integrally formed securing/locating lip of increased dimension at one end of the sleeve.

16. The thermal insulating sleeve liner as in claim 15 further comprising an integrally formed pattern of externally protruding ribs.

17. A fluid flow device having the thermal insulating sleeve liner as in claim 15 installed within the fluid flow bore of the fluid flow device, wherein said securing/locating lip at one end is fitted within and affixed to an increased diameter proximal portion of the fluid flow bore, another end of the sleeve being butted against a smaller diameter distal portion of the fluid flow bore.

18. A fluid flow device having the thermal insulating sleeve liner as in claim 13 installed within the fluid flow bore of the fluid flow device, wherein one end of the sleeve is butted against a smaller diameter distal portion of the fluid flow bore and another end of the sleeve is abutting a securing/locating ring-shaped cap welded to a larger diameter proximal portion of the fluid flow bore.

19. A fluid flow device having a thermal insulating sleeve liner installed within a fluid flow bore of the fluid flow device and comprising a valve with flanged pipe connectors, said thermal insulating sleeve liner being installed within at least one of the flanged pipe connectors of the valve, wherein said thermal insulating sleeve liner comprises:

a monolithic hollow cylindrical metallic sleeve having an outer diameter sized to slide into a fluid flow path bore of a fluid flow device thereafter accommodating a fluid flow path there-within, said metallic sleeve having two spaced-apart cylindrical shells and an internal infill pattern of integrally formed supporting structure there-between including internal interstices providing increased thermal resistance to heat flowing from inside the sleeve to outside the sleeve.

20. The fluid flow device as in claim 19, wherein the thermal insulating sleeve liner further comprises a wear-resistant coating on the inner surface of an internal shell of the two spaced-apart cylindrical shells.

\* \* \* \* \*